Figure 1:
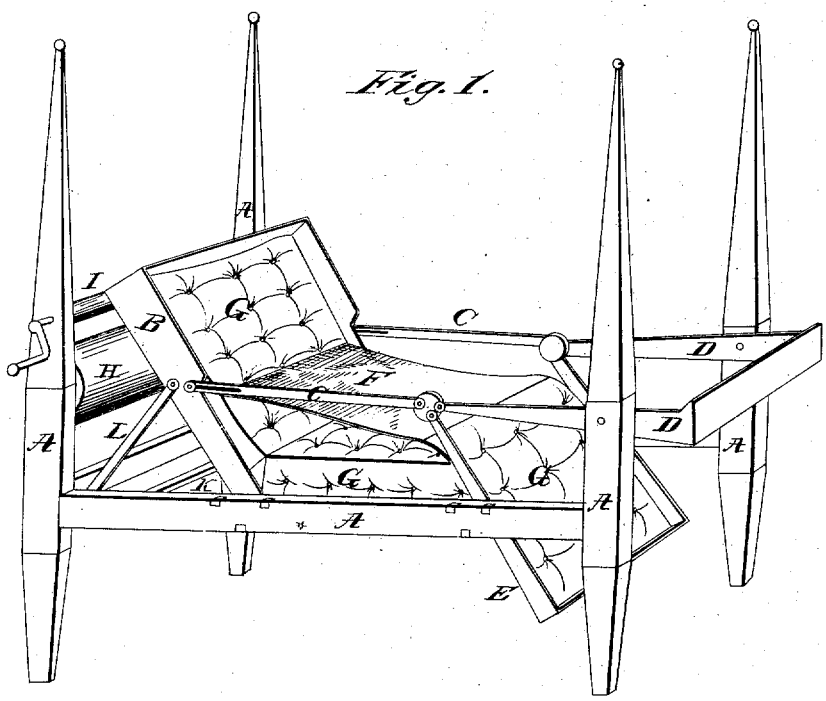
Figure 2:
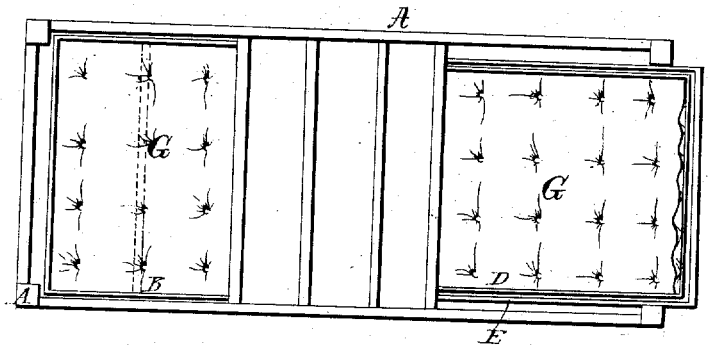

6775X

W. WOOLLEY.

Hospital Bedstead.

Patented Sept. 28, 1831

Witnesses:
Owen P. Warren
Thomas J. Pate

Inventor
William Woolley.

N. PETERS. Photo-Lithographer, Washington, D. C.

Williams Woolley of New York City

Letters Patent

The schedule referred to in these Letters Patent and making part of the same, con-
taining a description in the words of the said Williams Woolley himself
of his improvement in the Bedstead which he denominates the "Improved Chair
or Hospital Bedstead"

To all whom these presents shall come. Be it known that I Wil-
liams Woolley of the City County and State of New York, have Invented a
new and valuable improvement in the Construction of a Bedstead for the
sick or wounded, and that the following is a full and exact description of
the construction and operation of said improvement as invented by me.

This new and valuable improvement is constructed in a frame similar
to the common post Bedstead, now in use. It possesses the valuable princi-
ple of being converted into an easy chair when one is required.

It consists in the first place of two moveable leaves, or frames, one of
which is attached to the head, and the other to the foot of the frame before
mentioned; these leaves are moveable similar to those of a table, placed in
a reversed position. and rest when down upon the cross bars at the head
and foot of the frame. The sacking is secured at the head and foot to
bars, made to fit within the leaves. These bars are secured to those of the leaves
at the head and foot. and parallel to their surfaces by common bed screws
passing through both. which afford the facility of tightening the sacking
at pleasure. This tightening principle is also applied to the sides of the sack-
ing by means of short bars placed between the ends of the leaves, and secured
(by screws in the same way as the head and foot) to the centres of the parallel
bars of the frame. This forms the seat of the chair when required.

To convert the Bedstead into an easy chair; instead of a cross bar
between the posts at the foot of the frame. There is a pin which passes
through. the post or frame at the foot and enters a hole for that purpose-
placed in the leaf. This pin is removable at pleasure, and when withdrawn the
foot leaf falls down at right angles. The head leaf is elevated by means

[illegible]

of cords which pass over rollers placed within the head posts. These cords are wound on a drum. or shaft. by a crank, under the whole. The improved chair bed-stead possesses also the invaluable principle of raising the Patient without incon-venience, when evacuation by stool is necessary.

This is effected by having a light stuffed and quilted sacking above the bed which has an aperture in the centre for the convenience of the Patient. this is secured at the ends by loops to the leaves, at the sides there are two arms which extend inclined from the head leaf nearly to the foot where they are suspended by a cord attached to the foot post They are secured at the head by pivots or bolts to the sides of the leaves. To each side of the upper sacking and at proper distances apart. are two loops. which before the patient is raised must be placed over the corresponding — Knot, in the arms before mentioned If the crank then be turned, the bars at the sides. are elevated with the head leaf. and raise with them the up-per sacking of the necessary hight to insert under it a bed pan or other utensil. The arms at the sides also serve as a seat for the patient when sitting up. To dispense with the cords and crank. the arms may be fur-nished with a rack. to catch over a bolt at the foot of the frame. In this case the head leaf is raised by hand The subscriber claims the privilege of applying his improved Head caps for hiding the screws and bolts. in his.

This improvement consists of a square piece of tin or other suitable met-al, with the lower edge and sides bent over so as to form a groove: and a hole in the centre of sufficient size to admit the screw. These are fasten ed on with tacks over the screw hole. and another piece of the same metal is slid into the grooves, and conceals the screw from sight. The whole should then be japanned or painted Exd. Witnesses
W. Lau Gardenier }
W. P. Blagrove }

William Woolley ( Patented Sept 28. 1831 ) ( 744 words